Patented Aug. 5, 1952

2,606,127

UNITED STATES PATENT OFFICE 2,606,127

LIGHT-WEIGHT BUILDING MATERIALS AND THEIR MANUFACTURE FROM SYNTHETIC ANHYDROUS CALCIUM SULFATE

Herman Weber, Harriman, Tenn.

No Drawing. Application March 25, 1949,
Serial No. 83,520

4 Claims. (Cl. 106—87)

This invention relates to light-weight building stones, plates, insulating materials, etc., and more specifically to the manufacture of products of this kind from synthetic anhydrous calcium sulphate.

As a starting material I use the residue of the process of manufacturing hydrofluoric acid from fluorspar. Said residues, as they occur in this process, are an anhydrous calcium sulphate, containing, according to the starting material (fluorspar) certain impurities. On an average, the residue contains, besides calcium sulphate, small varying amounts of sulphuric acid, hydrofluoric acid, and also aluminum oxide, silicon oxide, iron oxide, and calcium fluoride.

It is an object of this invention to provide expanded porous products from said materials in a very simple and inexpensive manner.

Another object of the invention is the process of manufacturing products of this kind, which process requires a minimum of treatment and handling of the raw material.

Other objects and advantages of this invention will become apparent from the following specifications thereof.

It has been discovered that the gases necessary for producing a cellular structure in light-weight building stones, plates, and insulating materials can be developed before and during the setting process by the action of mineral acids, e. g. sulphuric acid, on certain suitable siliceous materials which decompose by action of mineral acids with accompanying evolution of gases.

Suitable siliceous materials to be used according to this invention are hydrated combustion residues (fly ash, boiler or furnace cinders, furnace slag, and others), or those natural silicates which decompose by action of mineral acids (e. g. sulphuric acid) with evolution of gases. The sulphuric acid can be of technical grade, or waste acid from various industrial processes such as the sulphonation of organic compounds.

According to one embodiment of my invention, fresh unneutralized residues of the process of manufacturing hydrofluoric acid are used as a raw material. In this case, no addition of acid is required for evolution of gases from the siliceous material. The residue of a fineness to pass an 80 mesh sieve is mixed with appropriate amounts of siliceous materials and water as described in the following examples.

Suitable siliceous materials for this purpose are again the hydrated combustion residues, smelter slags, or natural silicates as previously described, which decompose by action of the mineral acids present in the raw residue.

When poured into molds, the mixture will expand due to the formation of gases from the action of the acids on the siliceous materials and form the porous stones, blocks, bricks, or plates suitable for interior walls and surfaces according to the properties noted.

No addition of any kind of accelerator is necessary as the setting agents are also liberated by the action of the acid on the siliceous material.

Example 1

By weight:
 100 parts acidulous anhydrous calcium sulphate residue
 60 parts fly ash (or other siliceous material)
 45 parts water

| Test results: Age | 7 days | 28 days |
|---|---|---|
| Compression resistance (pounds p. s. i.) | 400+ | 500+ |

Percent expansion: 25–30%.

Density: 0.9–1.2
This density can be changed by controlling the amounts of acid in the residue through partial neutralization, or by addition of more acid, or by varying the amount of siliceous material in proportion to the density and strength required. The material is sawable, nailable, and fire resistant, and has excellent thermal and acoustical insulating properties.

According to another embodiment of my invention the residue anhydrous calcium sulphate ($CaSO_4$) containing small varying amounts of sulphuric acid ($H_2SO_4$) and hydrofluoric acid ($H_2F_2$) is neutralized with limestone dust ($CaCO_3$), ground to pass an 80 mesh sieve, mixed with appropriate amounts of suitable siliceous material and 2½–5% solution of sulphuric acid as described in Example 1.

If residues are used which are derived from a waste dump and which have been exposed to weather and thereby neutralized, no further neutralization with limestone dust or other basic substances is required.

When poured into molds, the mixture will expand due to the formation of gases resulting from the action of the acid on the siliceous materials, and set to form porous stones, blocks, bricks, or plates suitable for interior walls and surfaces according to the properties noted.

No addition of any kind of accelerator is necessary as the needed setting agents are also liberated by the action of the acid on the siliceous materials.

Example 2

By weight:
 100 parts neutral anhydrous calcium sulphate residue
 50 parts ground fly ash (or other hydrated siliceous materials)
 50 parts aqueous sulphuric acid (5%)

| Test results: Age | 7 days | 28 days |
|---|---|---|
| Compression resistance (pounds p. s. i.) | 550% | 1,000% |

Expansion: 25–30%.

Density: 0.9–1.2
This density can be controlled by varying the amounts of acid or siliceous material used to cause the expansion. The blocks are ready for use after drying in atmospheric storage for 8–10 days; or after being kiln dried at 50–80° C. for one day. The material is sawable, nailable, and fire resistant, and has excellent thermal and acoustical properties.

Having described my invention, what I claim is:

1. A plaster composition capable of setting with a porous cellular structure if treated with water, consisting, by weight, of about 100 parts of acidulous synthetic anhydrous calcium sulfate residues derived from the process of manufacturing hydrofluoric acid; and about 50–75 parts of a siliceous material which decomposes by the action of acid under an evolution of gas, said siliceous material being selected from the group consisting of hydrated combustion residues, fly ash, smelter slags and cinders.

2. A plaster composition capable of setting with a porous cellular structure if treated with a weak solution of a mineral acid, said composition consisting, by weight, of about 100 parts of neutral or neutralized synthetic anhydrous calcium sulfate residues derived from the process of manufacturing hydrofluoric acid from fluorspar by treatment with concentrated sulfuric acid; and about 50–75 parts of a siliceous material which decomposes by the action of acid under an evolution of gas, said siliceous material being selected from the group consisting of hydrated combustion residues, fly ash, smelter slags and cinders.

3. The process of manufacturing porous lightweight building materials, as stones, plates, blocks, insulations, etc., which consist in mixing 100 parts by weight of the acid residues accruing from the process of manufacturing hydrofluoric acid from fluorspar by treatment with concentrated sulfuric acid, said residues consisting chiefly of synthetic anhydrite and small amounts of sulfuric acid and hydrofluoric acid, with about 50–75 parts of a siliceous material which decomposes by the action of acid under an evolution of gas, said siliceous material being selected from the group consisting of hydrated combustion residues, fly ash, smelter slags and cinders; pouring this material mixed with water into molds wherein by the action of the acids contained in said residues said siliceous materials are decomposed under evolution of gases and expansion of the plastic mass.

4. The process of manufacturing porous lightweight building materials, as stones, plates, blocks, insulations, etc which consists in mixing 100 parts by weight of neutral residues derived from the process of manufacturing hydrofluoric acid from fluorspar with concentrated sulfuric acid, said residues consisting mainly of synthetic anhydrite, with 50–75 parts of a siliceous material selected from the group consisting of hydrated combustion residues, fly ash, cinders, smelter slags; pouring this material mixed with a 2½–5% solution of sulphuric acid into molds, wherein under the action of said sulphuric acid said siliceous materials are decomposed under evolution of gas and expansion of the plastic mass.

HERMAN WEBER.

REFERENCES CITED

The following references are of record in the file of this patent:

UNITED STATES PATENTS

| Number | Name | Date |
|---|---|---|
| 230,151 | Sanford | July 20, 1880 |
| 1,597,093 | Malloy | Aug. 24, 1926 |
| 1,951,691 | Coxon | Mar. 20, 1934 |

FOREIGN PATENTS

| Number | Country | Date |
|---|---|---|
| 524,147 | France | 1921 |
| 401,190 | Germany | 1924 |
| 706,007 | Germany | 1941 |